March 15, 1966     W. J. SCHMIDT ETAL     3,241,021

AUTOMATIC POSITIONING APPARATUS

Filed Dec. 17, 1962     4 Sheets-Sheet 1

INVENTOR
WARREN J. SCHMIDT
JACOB RABINOW
WILLIAM FISCHER

BY Arnold and Roylance

ATTORNEY

March 15, 1966   W. J. SCHMIDT ETAL   3,241,021
AUTOMATIC POSITIONING APPARATUS
Filed Dec. 17, 1962   4 Sheets-Sheet 3

INVENTOR
WARREN J. SCHMIDT
JACOB RABINOW
WILLIAM FISCHER
BY Arnold and Roylance
ATTORNEY March 15, 1966  W. J. SCHMIDT ETAL  3,241,021
AUTOMATIC POSITIONING APPARATUS
Filed Dec. 17, 1962  4 Sheets-Sheet 4

INVENTOR
WARREN J. SCHMIDT
JACOB RABINOW
WILLIAM FISCHER
BY Arnold and Roylance
ATTORNEY

United States Patent Office 3,241,021
Patented Mar. 15, 1966

3,241,021
AUTOMATIC POSITIONING APPARATUS
Warren J. Schmidt, Rockville, Jacob Rabinow, Takoma Park, and William Fischer, Silver Spring, Md., assignors, by mesne assignments, to American Machine & Foundry Company, New York, N.Y., a corporation of New Jersey
Filed Dec. 17, 1962, Ser. No. 245,294
11 Claims. (Cl. 318—162)

This invention relates to automatic positioning apparatus, and more particularly to methods and apparatus for recording a position data program and for utilizing such a previously recorded position data program to automatically position a movable member.

Automatic positioning apparatus currently finds extensive use in automatic industrial machinery which is required in the ever increasing trend toward automation in order to offset the ever rising labor costs. Most contemporary automatic positioning systems are basically numerical control systems utilizing combined digital and analog techniques. With such numerical control systems, the various successive desired locations of a movable member are precalculated, translated into digital computer language and then stored in a suitable storage medium such as punch cards or magnetic tape. Thereafter, a computer can extract the digital data from the storage medium and position the movable member, or members, by means of suitable servomechanisms, Thus, the movable member is moved automatically to the succesive precalculated locations, thereby tracing the locus of a desired movement. The expense of highly skilled personnel required for establishing the initial computer program and for manitaining the computer, as well as the expense of the computer itself, places limits on the amount of automatic machinery which can economically be justified. A substantial need therefore exists for automatic positioning apparatus which is less complex and which can more easily be programmed.

Present numerical control systems can be classified as of two basic types, namely, the incremental systems and the absolute systems. In the incremental systems, signal events or pulses are developed representing quanta of movement such that numerical position data can be obtained by means of a reversible counter responsive to the signal events or pulses. In other words, each of the possible required locations of the movable member is identified by a mark, all such marks being essentially the same and significant only by the relative position with respect to other marks, such that, each time a mark is encountered, a pulse is produced signifying a quantum of movement. The control instructions for incremental systems provide information regarding the direction of travel and the number of spaces to travel. Thus, these instructions can be characterized as taking the form "starting from a reference position, move 20 spaces to the right, then move 12 spaces to the left, then move 6 spaces to the left, etc."

In an absolute system, coded signals are developed in accordance with a numerical code such that the coded signals represent the present absolute positions of an associated movable member. In other words, each of the possible required locations is identified by a significantly different mark so that the particular mark encountered causes a numerically coded signal to be developed identifying the position of the movable member. The control instructions for absolute systems provide numerical information designating successive desired positions of the movable member. These instructions can be characterized as taking the form "first move to position 36, then move to position 39, then move to position 12, etc."

The disadvantages encountered with the incremental and absolute systems are numerous. One disadvantage is that these systems require an encoding unit provided with position indicating marks to perform the analog to digital conversion. Such encoding units must be constructed with precision in order to obtain the desired spacing between the adjacent marks, and must be very accurately aligned with respect to the movable member being positioned. Furthermore, the encoder required for absolute systems must be fairly elaborate in order to provide a different numerical coded signal for each of the different positions. These encoding units involve a considerable expense, particularly where accuracy is required. Another disadvantage is that the computers required in incremental or absolute systems often reach awesome proportions, particularly where a large number of program points and a large number of possible required locations are desired. The computer usually requires a storage medium such as punch cards or magnetic tapes, apparatus for extracting data from the storage medium, temporary storage registers for holding the extracted data, additional temporary storage registers for holding the position data from the encoders, numerical comparators for comparing data in the registers, and logic circuitry for driving a movable member in accordance with the comparator output. Still another disadvantage is that the programming of these systems is relatively complex and usually requires highly trained and skilled personnel. The various program points are normally precalculated and must be converted to computer language and then stored in the storage medium.

This invention relates to an entirely new system which is a complete departure from the earlier incremental and absolute systems. In accordance with this new system, marks are placed on a recording medium at locations indicative of desired locations of the associated movable member. The control instructions for this system merely indicate the necessary direction of travel required to reach the previously recorded mark. Thus, the instructions can be characterized as taking the form "starting from a reference position, move to the right until a previously recorded mark is detected, then move to the left until the next previously recorded mark is detected, etc."

One advantage of this new system is that the need for accurately constructed and aligned encoders is eliminated. Another advantage is that the associated computer for the new system merely performs simple control logic functions and does not handle complex numerical data as is required in the incremental and absolute systems. Thus, the cost and size of the computer is considerably reduced. Still another advantage is that the new system can be programmed by a relatively unskilled person, since there is no need to precalculate numerical positions and translate these positions into computer language. Furthermore, the new system is not restricted to a limited number of possible locations such as is the case in the incremental or absolute systems.

An operative embodiment incorporating the new system utilizes a transducer coupled to the movable member being positioned such that the position of the transducer with respect to a recording medium is always a function of the movable member position. When it is desired to record position data program points, the movable member is appropriately positioned and the transducer is then actuated to record a position mark on the recording medium, the location of this position mark on the recording medium thus being a function of the associated movable member position. Whenever it is thereafter again desired to position the movable member in accordance with this program point, it is merely necessary to set the movable member in motion until the transducer detects the previously recorded mark.

When the program is to include a plurality of successive program points, it is necessary to avoid ambiguity between the position marks. One method of eiliminating ambiguity is to record a different type position mark for each program point such that, during the playback operation, the transducer can selectively be made responsive to the different type marks successively. The cost of apparatus for recording the different type marks, and of apparatus selectively responsive to such different type marks increases considerably as the number of the different type marks increases.

In most installations, the motion of the movable member can be restricted to a bidirectional linear movement or a bidirectional angular movement about a single axis, since a number of such movable members can easily be combined to control additional degrees of movement. With the motion so restricted, the movement of the transducer can be confined to a track on the recording medium making possible recordation of a plurality of non-ambiguous program points utilizing marks of essentially the same type. The method for recording these program points involves utilizing a plurality of separate tracks and recording the separate successive position marks in separate tracks. This method can be further modified to increase the program point storage capacity by recording as many successive program points in the same track as is possible without crossing a previously recorded mark. During the playback operation, the transducer following the same path along the recording track would reach the successive marks in the appropriate order and therefore no ambiguity results.

A more detailed description of the invention is set forth in the following portion of the specification and accompanying drawings, the drawings forming a part of the specification, and wherein.

FIGS. 1–4 illustrate apparatus in accordance with one embodiment of the invention. A stationary disc 1, preferably of aluminum or other nonmagnetic material, is supported by a support block 3 and a stationary shaft 2 rigidly secured between the disc and the support block. Surface 4 opposite the supporting structure attached to the disc is coated with a magnetizable medium such as iron oxide.

Figures 1, 2:
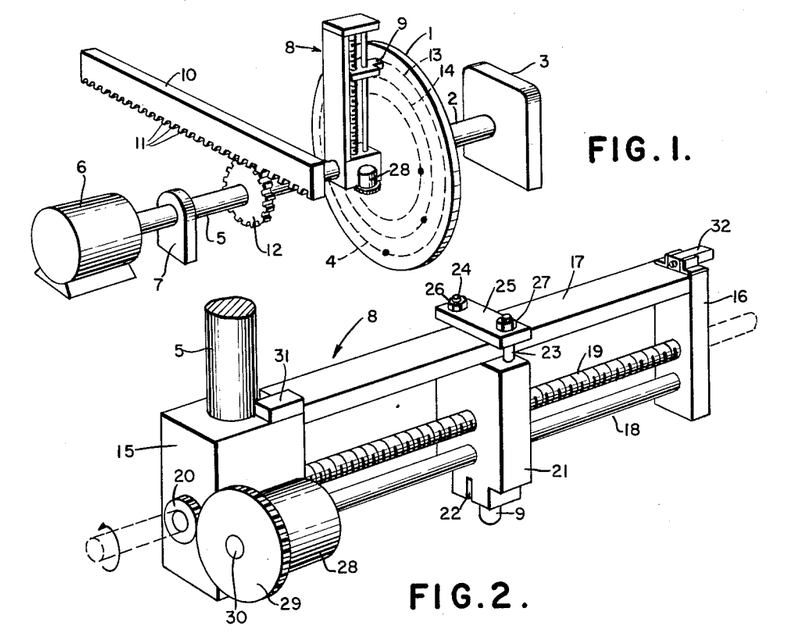
FIG. 1 is a perspective diagrammatic view of the apparatus in accordance with one embodiment.
FIG. 2 is a perspective view of the head indexing apparatus utilized in the apparatus shown in FIG. 1.

Shaft 5 of electric motor 6 is journaled in a support member 7 and has a positioning and indexing mechanism 8 rigidly affixed to its free end. Preferably, motor 6 is of the type including a brake unit which is automatically released when the motor is energized and is automatically actuated when the motor is not energized. The mechanism supports a transducer 9, in the form of a magnetic read-write head, in a position closely adjacent magnetic coated surface 4. The mechanism is operative to selectively index read-write head 9 to various radial distances from the center of disc 1 and to position the head angularly with respect to the disc surface. Movable member 10 is shown as a solid, elongated bar in the form of a rack having teeth 11 along the lower surface. Teeth 11 mesh with the teeth of a pinion gear 12, the pinion gear being rigidly affixed to shaft 5. Pinion gear 12 is preferably of the split gear anti-backlash type. Rotation of shaft 5 causes movable member 10 to move along its longitudinal axis, and simultaneously causes read-write head 9 to move in a circular path with respect to disc 1. Accordingly, the angular position of read-write head 9 with respect to disc 1 is always a function of the position of movable member 10.

The positioning and indexing mechanism is shown in greater detail in FIG. 2, and includes a support block 15 affixed to the free end of shaft 5. An end support block 16 is spaced from support block 15 by a distance slightly greater than the radius of disc 1 (FIG. 1). An elongated rectangular slide bar 17 is rigidly secured between blocks 15 and 16 flush with the upper surfaces (as viewed) of the blocks, and a cylindrical slide bar 18 is rigidly secured between the blocks at a position closer to the lower surfaces. A threaded shaft 19 is journaled between end support blocks 15 and 16 parallel to and between the slide bars. A gear 20 is secured to threaded shaft 19 at the free end which emerges from support block 15.

A head support member 21 is provided with a bore extending upwardly from the lower surface (as viewed) and with a transversely extending slot 22 extending upwardly from the lower surface and passing through the center of the bore. The bore diameter is such that a read-write head 9 can be secured in the bore, extending slightly below the lower surface, the head being secured by means of a force fit. Slide bar 18 passes transversely through head support member 21 by means of a bore suitably spaced above transverse slot 22, the diameter of the bore being sufficient to avoid friction between the slide bar and the head support member. Threaded shaft 19 is accommodated by a suitable internally threaded transverse bore extending through the head support member.

A pair of studs 23 and 24 are secured extending upwardly (as viewed) from the upper surface of head support member 21, the spacing between the studs being sufficient to accommodate the width of rectangular slide bar 17. Each stud is threaded at the free end and is provided with an annular shoulder separating the threaded portion from the nonthreaded portion, the annular shoulders being spaced above head support member 21 by a distance slightly greater than the height of rectangular slide bar 17. A rectangular cross plate 25 is provided with a pair of apertures suitably spaced to accommodate studs 24 and 25, and is secured against the shoulders of these studs by means of a pair of threaded nuts 26 and 27. Thus, as threaded shaft 19 is rotated, head support member 21 and read-write head 9 are moved toward one of the support blocks 15 or 16.

A digital motor 28 is so secured to support block 15 that gear 29 attached to motor shaft 30 meshes with gear 20 at the end of threaded shaft 19. Either gear 20 or gear 29 is preferably of the split gear anti-backlash type. Digital motor 28 is of the type which makes one complete revolution and then stops when actuated by a single electrical pulse. A limit switch 31 is secured to the upper surface of end support block 15 and another limit switch 32 is secured to the upper surface of support block 16. These limit switches are so positioned that cross bar 25 will actuate the switches when support member 21 is adjacent the associated support block. These limit switches are operative, by means of circuits (not shown), to automatically disconnect the digital motor when it attempts to advance the head support member beyond the support blocks.

Assuming that the head support member is in the upper position, as viewed in FIG. 1, rotation of shaft 5 causes the head to travel in a circular path with respect to disc 1, this circular path being referred to as the outermost track 13 on disc 1. When digital motor 28 is actuated, head 9 is indexed a radial increment toward the center of disc 1. With the head in this position, it can move in a circular path as shaft 5 rotates, this path being referred to as a second concentric track 14 on disc 1. The pitch of threads on threaded shaft 19, and the relative diameters of gears 20 and 29 is such that the spacing between concentric tracks on disc 1 is sufficient to prevent cross talk between adjacent tracks, i.e., sufficient to prevent the read-write head from detecting recorded magnetic marks on more than a single track. Additional concentric tracks are formed on disc 1 in like manner.

The apparatus shown in FIG. 1 is operated in a record mode during which position marks are recorded on disc 1, and in a playback mode during which the movable member 10 is positioned to locations corresponding to previously recorded position marks. When recording a program, indexing mechanism 8 is first operated to position read-write head 9 a radial distance corresponding to the outermost track 13 on disc 1. Movable member 10 is then positioned, either manually or by control of motor 6, to the first selected location corresponding to the first point on the program being recorded. This positioning of the movable member automatically positions read-write head 9 angularly to a corresponding position. Read-write head 9 is then actuated to place a magnetic position mark on disc 1 in track 13, at this corresponding position. The second point on the program is recorded by indexing read-write head 9 inwardly to track 14. Movable member 10 is then positioned to a second selected point on the program and read-write head 9 is then actuated to record a second position mark. Additional program points are similarly recorded by positioning movable member 10 and then placing a mark on the appropriate track on disc 1.

When operating the apparatus in the playback mode, movable member 10 is first placed at an initial position and read-write head 9 is positioned on outermost track 13. Motor 6 is then actuated, causing the movable member 10 to move in a direction toward the first program point, causing read-write head 9 to move along track 13 toward the first recorded position mark. When read-write head 9 detects the first recorded position mark, motor 6 is deenergized, the brake therein actuated, and the indexing mechanism 8 is actuated, indexing read-write head 9 to track 14. Motor 6 is then again energized and the brake released, causing the movable member and read-write head 9 to move to the second position mark. The playback operation is continued in this manner, successively positioning movable member 10 to locations corresponding to successive position mark locations.

Figure 3:
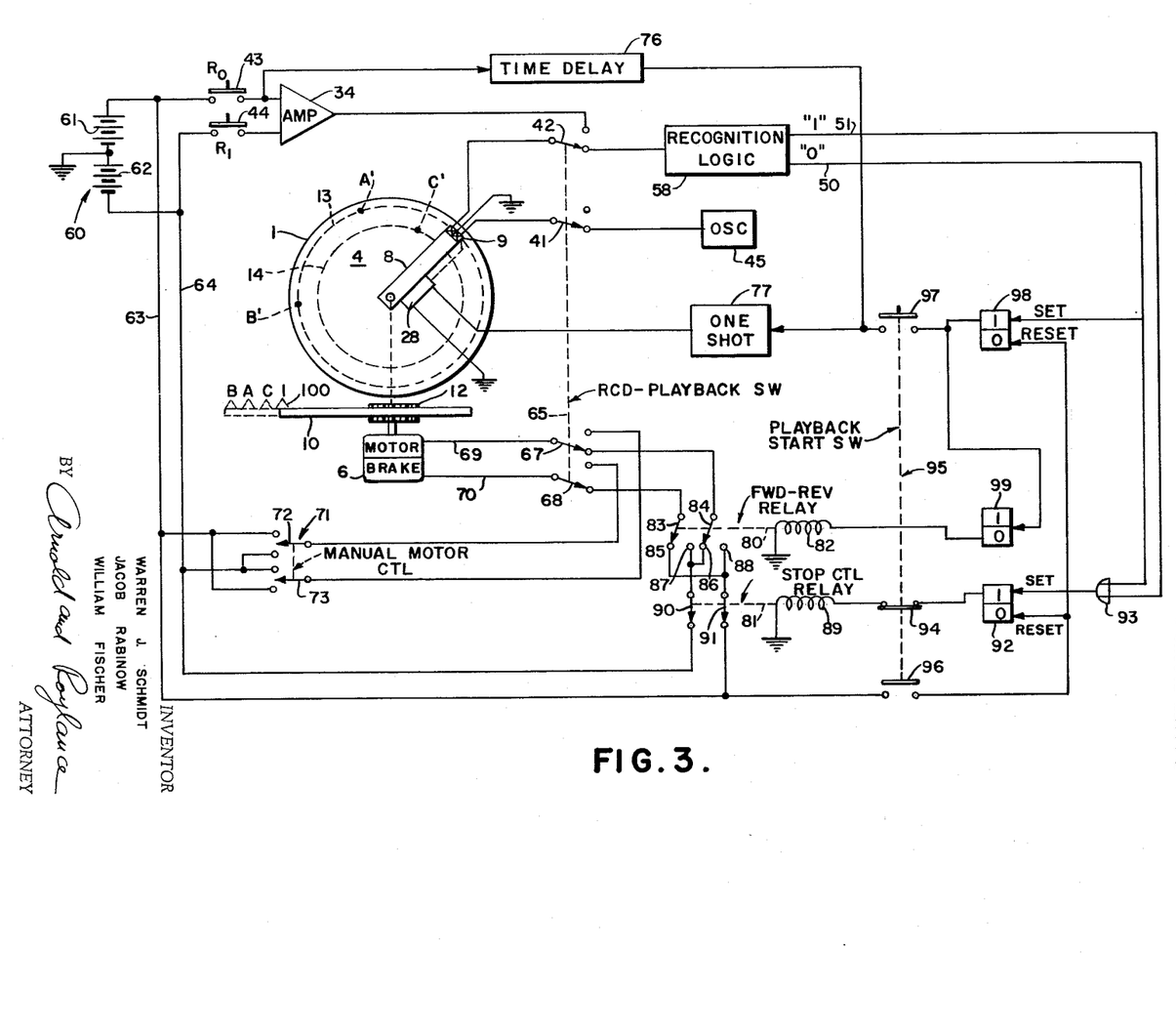
FIG. 3 is a schematic diagram illustrating the electrical control circuits for controlling the apparatus shown in FIG. 1.

In order to increase the number of program points which can be recorded on a single disc, it is often desirable to record more than a single position mark on a single track. Assuming that all of the recorded marks on the disc are of essentially the same type, it should be noted that where successive program points can be reached by travelling in the same direction, these program points can be recorded in the same track without resulting in any ambiguity, since during the playback mode the marks would be detected in the appropriate successive order. However, where a reversal of direction is required to reach the next program point, this program point cannot be recorded on the same track as previous marks, since during the playback mode the marks would not be detected in the appropriate successive order. Thus, in accordance with a method of arranging data in accordance with this invention, as many program points as can be reached by travelling in the same direction are recorded by position marks on a single track, and program points which require a reversal of direction are recorded in different tracks. Since magnetic marks of two different types can easily be recorded, it is also convenient to record directional data on the disc. In accordance with a further method of arranging data in accordance with this invention, a magnetic mark of one type, referred to for convenience as a "0" mark, is recorded when a reversal of direction is required to reach the next successive program point, and a magnetic mark of a second type, referred to for convenience as a "1" mark is recorded for all other program points. The electrical circuit for recording program points in accordance with these methods, and for automatically operating the apparatus in the playback mode in accordance with such recorded data is illustrated in FIG. 3 with the specific circuits for recording and detecting magnetic marks of two different types being shown specifically in FIG. 4.

Figure 4:
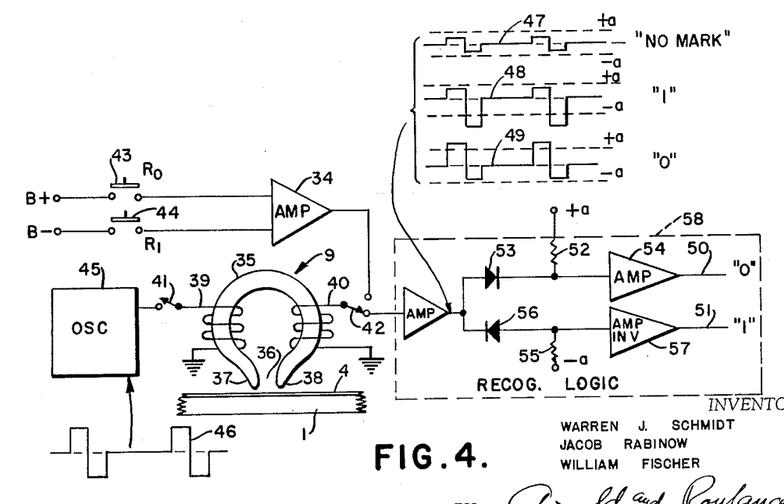
FIG. 4 is a detailed schematic diagram of the magnetic read-write transducer and associated circuits forming part of the control circuits shown in FIG. 3.

As shown in FIG. 4, read-write head 9 includes a generally U-shaped soft iron core piece 35 shaped to define an air gap 36 between legs 37 and 38 of the core piece. Air gap 36 is in the order of a few thousandths of an inch, the space between the legs and the magnetic surface 4 being slightly less. A winding 39, having one end grounded, is so wound through the center of core piece 35 and surrounding leg 37 that when energized by a positive potential a clockwise flux is produced in the core piece. A winding 40, also having one end grounded, is similarly wound through the center of the core piece and surrounding leg 38 such that when energized by a positive potential a clockwise flux is produced in the core piece. Core piece 35 and associated windings 39 and 40 are preferably imbedded in a suitable potting compound so as to form a cylindrical unit such as shown in FIG. 2.

A normally open "$R_0$" switch 43 is connected between a positive source of potential B+ and one input of an amplifier 34. A normally open "$R_1$" switch 49 is connected between a negative source of potential B— and the other input of amplifier 34. Amplifier 34 is a D.C. amplifier which provides electrical isolation between the inputs. The output of amplifier 34 is connected to winding 40 via the movable contact of a two-position switch 42 when the movable contact is in the upper position. When the "$R_0$" switch 43 is closed, a positive potential is applied to the amplifier in turn causing winding 40 to be energized by a positive potential from the amplifier. Winding 40 creates a clockwise flux in core piece 35 which crosses air gap 36 recording a magnetic mark on surface 4, north to south between legs 37 and 38, respectively. For convenience, this magnetic mark is referred to as a recorded "0" mark. When the "$R_1$" switch 44 is closed, a negative potential is applied to the amplifier, in turn causing winding 40 to be energized by a negative potential from amplifier 34. In response to the applied negative potential, winding 40 creates a counterclockwise flux in the core piece which crosses air gap 36, recording a south to north magnetic mark on surface 4 between legs 37 and 38, respectively. For convenience, this magnetic mark is referred to as a recorded "1" mark.

The type of mark, or the lack of a mark on disc 1 can be detected by energizing oscillator 45 and by moving switch 42 to the lower position to connect recognition logic circuit 58 to winding 40. Oscillator 45 is connected to winding 39 via a switch 41, and when energized produces an interrogation signal 46. The interrogation signal includes a positive pulse followed immediately by a negative pulse, such a group of pulses being separated from similar groups of pulses by a short time interval. The magnitude of these interrogation pulses is not sufficient to materially alter a magnetic mark appearing on the disc below core piece 35. If there is no magnetic mark beneath core piece 35, an output signal 47 is generated in winding 40 which, after amplification, is essentially the same as interrogation signal 46 except for magnitude. The positive and negative pulses of output signal 47 do not exceed the arbitrary limits $+a$ and $-a$. If a recorded "1" mark appears beneath core piece 35, the flux of this magnetic mark opposes the clockwise flux created by the positive interrogation pulse, and aids the counterclockwise flux generated by the negative interrogation pulse. The resulting output signal generated in winding 40 after amplification has relatively small positive pulses not exceeding the value $+a$ and relatively large negative pulses which exceed the value $-a$. If a recorded "0" magnetic mark appears beneath core piece 35, the magnetic flux of the mark aids the clockwise flux produced by the positive interrogation pulse and opposes the counterclockwise flux produced by the negative interrogation pulse. The resulting output signal 49 generated in winding 40 after amplification has relatively large positive pulses exceeding the value $+a$ and relatively small negative pulses not exceeding the value $-a$.

The recognition logic circuit 58 is capable of distinguishing between the three types of output signals 47–49 and provides an output signal on line 51 only when a "1" mark is present, and provides an output signal on line 50 only when a "0" magnetic mark is present.

The lower stationary contact associated with movable switch contact 42 is connected to the input of a pulse amplifier 59. A resistor 52 is connected between a source of potential $+a$ and the cathode of a diode 53, the anode of the diode being connected to the output of amplifier 59. The input of an amplifier 54 is connected to the junction between diode 53 and resistor 52, the output of the amplifier being connected to line 50. Whenever the potential applied to diode 53 is less than the value $+a$, diode 53 is back biased and therefore the potential $+a$ is applied at the input of amplifier 54. When the potential applied to diode 53 exceeds the value $+a$, the diode becomes conductive, increasing the input potential applied to amplifier 54. The amplifier is biased to provide an output pulse on line 50 when input potential exceeds the value $+a$. The only circumstances which cause a potential exceeding the value $+a$ to be applied to diode 53, and therefore the only circumstances which cause an output pulse to be provided on line 50 is the presence of a "0" magnetic mark which causes output signal 49.

A resistor 55 is connected between a source of potential $-a$ and the anode of a diode 56, the cathode of the diode being connected to the output of amplifier 59. The input of an amplifier inverter circuit 57 is connected to the junction between the resistor 55 and diode 56, the output of the amplifier being connected to line 51. If the potential applied to diode 56 is more positive than the value $-a$, diode 56 is back biased. However, if the applied potential becomes more negative than the value $-a$, amplifier inverter circuit 57 becomes conductive and provides a positive potential on line 51. The potential applied to diode 56 becomes more negative than the value $-a$ only when a "1" magnetic mark is present.

The read-write circuits described in connection with FIG. 4 form part of the overall system shown in FIG. 3. Power for operating the various circuit components shown in FIG. 3 is provided by a power supply 60 including a battery 61 having its negative terminal connected to ground, and a battery 62 having its positive terminal connected to ground. A positive supply conductor 63 is connected to the positive terminal of battery 61 and the negative supply conductor 64 is connected to the negative terminal of battery 62. Accordingly, conductors 63 and 64 provide, respectively, positive and negative potentials with respect to ground.

A record-playback switch 65 has four sets of ganged movable contacts 41, 42, 67 and 68. Movable contacts 42 are connected to winding 40 (FIG. 4) of read-write head 9, and movable contacts 41 are connected to winding 39 (FIG. 4) of read-write head 9. Movable contacts 67 and 68 are connected to motor 6 via conductors 69 and 70, respectively. The control apparatus shown in FIG. 3 can be in either a record mode or a playback mode. When the movable contacts of record-playback switch 65 are in the lower position, as shown, the circuit components required during the playback operation are connected to read-write head 9 and motor 6. When the movable contacts are in the upper position (as viewed), the circuit components required for record operation are connected to the read-write head and motor 6. For convenience, the components utilized during the recording operation are first considered.

A manual motor control switch 71 has a pair of ganged movable contacts 72 and 73. These movable contacts can be moved upwardly (as viewed) to connect with an upper set of stationary contacts, or can be moved downwardly connecting with a lower set of stationary contacts, the normal position of the movable contacts being intermediate between the upper and lower sets of stationary contacts. The upper stationary contacts are connected to positive and negative supply conductors 63 and 64 such that when movable contacts 72 and 73 are in the upper position, potential can be supplied to motor 6 which is positive on conductor 70 with respect to conductor 69. The direct current motor is such that energization with this polarity causes a clockwise rotation. The lower stationary contacts of motor control switch 71 are connected to conductors 63 and 64 such that when movable contacts 72 and 73 are in the lower position, the polarity is reversed, thus causing a counterclockwise rotation of the motor.

Switches 43 and 44 are connected to the read-write head via amplifier 34 and movable contacts 42 of record-playback switch 65 and operate in the manner previously described. Switch 43 is connected to positive conductor 63 and switch 44 is connected to negative conductor 64. As will be described hereinafter in greater detail, the last of a series of successive program points which is recorded in a particular track is identified by a recorded "0" magnetic mark, and the next successive mark is recorded in an adjacent track. Thus, each time a "0" magnetic mark is recorded, it is required that the indexing mechanism be operated to move the read-write head to an adjacent track. The input of a time delay circuit 76 is connected to switch 43, the output of this circuit being connected to a one-shot multivibrator circuit 77. The output of the one-shot multivibrator circuit 77 is connected to actuate digital motor 28 of the indexing mechanism 8. The time delay of circuit 76 is on the order of a few milliseconds, which is sufficient to permit recording of a magnetic mark prior to indexing of the read-write head to an adjacent track. One-shot multivibrator circuit 77 provides an output pulse whenever a positive potential is applied to the input. Thus, when "$R_0$" switch 43 is closed, a positive potential is applied to amplifier 34 and a "0" magnetic mark is immediately recorded, and a short time delay thereafter one-shot multivibrator 77 is actuated, causing read-write head 9 to be indexed to an adjacent track.

The playback control circuits which are connected to read-write head 9 and motor 6 when the movable contacts of record-playback switch 65 are in the lower position (as shown), are next considered. The motor control circuits include forward-reverse relay 80 which provides directional control, and stop control relay 81 which provides on-off control. Relay 80 includes an actuating winding 82 and a pair of two-position movable contacts 83 and 84. The movable contacts 83 and 84 are connected respectively to conductors 69 and 70 via movable contacts 67 and 68 of record-playback switch 65. When actuating winding 82 is not energized, movable contacts 83 and 84 connect with stationary contacts 85 and 86, respectively, stationary contact 85 being connected to positive conductor 63 via normally closed contacts 91, and stationary contact 86 being connected to negative conductor 64 via normally closed contacts 90. Under these circumstances, potential can be supplied to motor 60 with a polarity such that conductor 70 is positive with respect to conductor 69, resulting in a clockwise rotation of direct current motor 6. When actuating winding 82 is energized, movable contacts 83 and 84 move to connect, respectively, with stationary contacts 87 and 88. Stationary contacts 87 and 88 are connected to cause a reversal of potential on conductors 69 and 70 and therefore when winding 82 is energized the potential which can be supplied to direct current motor 6 is negative at conductor 70 with respect to conductor 69, causing a counterclockwise rotation.

The stop control relay 81 includes an actuating winding 89 and a pair of normally closed contacts 90 and 91. Contacts 90 and 91 are connected between conductors 63 and 62 and conductors 69 and 70 via the contacts of the forward-reverse relay 80. As long as actuating winding 89 is not energized, energy can be supplied to motor 6, but as soon as actuating winding 89 is energized, contacts 90 and 91 open, disconnecting the motor from conductors 63 and 64.

The circuits for detecting the type of magnetic mark recorded on the disc or the absence of a magnetic mark beneath the read-write head 9 are as previously described with regard to FIG. 4. These circuits include oscillator 45 which provides a source of interrogation pulses and recognition logic circuit 58 which provides a series of positive pulses on conductor 50 if a "0" magnetic mark is beneath read-write head 9; provides a series of positive pulses on conductor 51 if a "1" magnetic mark is beneath read-write head 9; and provides no output pulses when neither type of magnetic mark is beneath read-write head 9.

During the playback operation, direct current motor 6 is energized, causing movable member 10 and read-write head 9 to move toward the first program point. The direct current motor remains so energized until read-write head 9 detects a magnetic position mark, either a "0" or a "1." When either of these magnetic marks is detected, the motor stops, or, in other words, actuating winding 89 of stop control relay 81 is energized when a series of positive pulses appears on either conductor 50 or 51. The circuit for accomplishing this control function includes a flip-flop multivibrator circuit 92. This flip-flop circuit has two stable states which, for convenience, are referred to as the "1" state and the "0" state. Whenever a positive pulse is applied to the set input, the flip-flop circuit assumes the "1" state and provides a positive output potential. Whenever a positive potential is applied to the reset input, the flip-flop circuit assumes the "0" state and no potential is supplied at the output. Conductors 50 and 51 are connected to the set input of flip-flop 92 via an OR logic circuit 93, this logic circuit being of the type which provides a positive pulse at the output whenever a positive pulse is applied at either of the inputs. The output of flip-flop 92 is connected to actuating winding 89 via normally closed contacts 94. The reset input of flip-flop 92 is connected to positive conductor 63 via normally open contacts 96. Normally closed contacts 94 and normally open contacts 96 are two of the ganged contacts of a playback start switch 95, with normally open contacts 97 forming a third set of contacts for this playback start switch.

When it is desired to energize motor 6 to move the movable member and the read-write head toward the next program point, playback start switch 95 is depressed, opening contacts 94 and closing contacts 96. When contacts 94 open, actuating winding 89 is de-energized and therefore contacts 90 and 91 move to the closed position, permitting energization of motor 6. Also, while switch 95 is in the depressed position, contacts 96 are closed and therefore a positive potential is applied on the reset input of circuit 92 and therefore circuit 92 assumes the "0" state. Thereafter, when switch 95 is released and returns to the normal position, actuating winding 89 remains in the de-energized state since there is no output potential from flip-flop circuit 92. These operating conditions exist until such time as the magnetic mark is detected by read-write head 9, causing a series of positive pulses to be supplied on one of the output lines 50 or 51. These positive pulses pass through OR logic circuit 93, causing flip-flop circuit 92 to assume the "1" state, thereby energizing actuating winding 89. When the actuating winding is energized, movable contacts 90 and 92 move to the open position and direct current motor 6 is therefore disconnected. When it is desired to again energize the direct current motor such that the read-write head 9 seeks the next recorded program point, playback start switch 95 is again depressed to initiate the operation.

In accordance with the method of arranging data on disc 1, a magnetic "1" mark indicates that additional program points are recorded on the same track and are reached by travelling in the same direction. An "0" magnetic mark indicates that the next successive program point is reached by reversing direction and is located on an adjacent track, and therefore it is necessary that the indexing mechanism and the direction changing mechanism both be operated in response to a detected "0" magnetic mark.

The circuit for controlling the indexing mechanism includes a flip-flop multivibrator 98 which is essentially the same as flip-flop multivibrator 92 previously described. The set input of circuit 98 is connected to conductor 50 and the reset input is connected to positive conductor 63 via normally open switch contact 96. The output of the flip-flop is connected to the input of one-shot multivibrator circuit 77 via normally open switch contacts 97. When playback start switch 95 is depressed, flip-flop 98 is reset and assumes the "0" state and therefore provides no output potential. If the magnetic mark subsequently detected is a "0" mark, the positive pulses on line 50 cause flip-flop 98 to assume the "1" state. A subsequent closing of switch 95, which energizes direct current motor 6 to seek the next program point, also applies the direct current output potential from flip-flop circuit 98, if in the "1" state, to one-shot multivibrator 77. As previously described, a positive potential so applied to one-shot circuit 77 energizes digital motor 28, causing the read-write head 9 to index to an adjacent track.

A binary flip-flop circuit 99 is utilized to control energization of forward reverse relay 80. The binary circuit has two stable states of conduction, referred to as the "0" state and the "1" state. This circuit has a symmetrical input connected to the output from flip-flop circuit 98 and changes state each time a positive potential is applied. Binary circuit 99 provides a positive output potential while in the "0" state. The output of the binary circuit is connected to actuating winding 82 of forward reverse relay 80. Thus, each time a '0" magnetic mark is detected, flip-flop circuit 98 assumes the "1" state and provides a positive potential to the symmetrical input of binary circuit 99, thus causing a change of state in the binary circuit. If it is assumed that the binary circuit is initially in the "0" state, an output potential is applied, energizing actuating winding 82. Under these circumstances, direct current motor 6 is conditioned for rotation in the counterclockwise direction when energized. When a "0" magnetic mark is subsequently detected, the binary circuit changes to the "1" state, de-energizing actuating winding 82. With the actuating winding de-energized, motor 6 is conditioned to rotate in the clockwise direction. In this manner, each time a magnetic "0" mark is detected the state of binary circuit 99 is changed, and therefore the direction in which direct current motor 6 is conditioned to rotate, is changed accordingly.

For purposes of illustration, it may be beneficial to illustrate the manner in which the apparatus records a simple program and subsequently utilizes the recorded program to control movable member 10 during the playback mode. Assume that movable member 10 is provided with a small indicating pointer 100, located at one end. Assume further that the program being recorded is a simple three-point program where, starting from an initial position where pointer 100 is at a position I, it is desired to move the movable member (as viewed) to the left, placing pointer 100 at a position A, to then move the movable member further to the left until pointer 100 is at a position B, and to then move the movable member to the right such that pointer 100 is at a position C.

For recording the program, the read-write head 9 is initially positioned at a radial distance corresponding to the outermost track 13 on disc 1, and the record-playback switch is moved to the upper position corresponding to the record mode of operation. The manual motor control switch 71 is then manipulated, moving the movable member 10 until pointer 100 is at the desired location A. This movement of movable member 10 causes a corresponding angular movement of read-write head 9 which moves in a counterclockwise direction to the position A' on disc 1 corresponding to the position A of movable member 10. The manner in which the movable member reaches position A is immaterial. Examining the program to be recorded, it is noted that the next successive program point B is reached by travelling in the same direction from program point A as is required to reach program point A from the initial point I. Accordingly, switch 44 is actuated, recording a "1" magnetic position mark at position A', indicating that during the playback mode the next successive point can be found on the same track and can be reached by travelling in the same direction. With the first program point being appropriately recorded, switch 71 is then again manipulated, bringing pointer 100 to position B and read-write head to a position B' on disc 1. Since the next successive program point C is reached by a reversal of direction, it must be recorded on an adjacent track, and therefore switch 43 is closed, causing a "0" magnetic mark to be recorded at position B' on disc 1. This "0" magnetic mark at position B' indicates that this is the last program point on track 13, and the next successive program point is reached by travelling in the opposite direction. When switch 43 is closed, the indexing mechanism is actuated via time delay circuit 76 and one-shot multivibrator circuit 77 automatically moves the read-write head 9 radially inwardly toward the adjacent track 14. The manual motor control switch 71 is then again manipulated, bringing pointer 100 to position C and the read-write head to a corresponding position C' on disc 1. Either switch 43 or 44 is then closed to record either a "0" or a "1" mark, depending upon the direction required to reach the next successive program point. This then completes the recording of the three-point program.

It should be noted that the initial position of read-write head as shown in FIG. 3, and corresponding to the initial position I of movable member 10, can be considered as the reference position on disc 1. The angular distances between this reference position and the recorded marks at locations A', B' and C' are indicative of the corresponding selected positions A, B, and C of the movable member.

To begin operation in the playback mode, movable member 10 and read-write head 9 are positioned in accordance with the initial position with pointer 100 at location I and read-write head 9 in the outermost position, corresponding with track 13. Flip-flop circuits 92 and 98 and binary circuit 99 are reset into the "0" state by means of conventional circuits (not shown). The record playback switch 65 is then moved to the lower position. Under these circumstances, stop control relay 81 is not energized, and forward reverse relay 80 is energized and therefore direct current motor 6 rotates in the counterclockwise direction as soon as record playback switch 65 is moved to the lower position. The counterclockwise rotation of motor 6 automatically moves movable member 10 and read-write head 9 in a direction toward the first program point. As soon thereafter as the read-write head 9 reaches the position above the recorded magnetic "1" mark at position A', a series of positive pulses appears on conductor 51. These positive pulses are applied to the set input of flip-flop 92, energizing actuating winding 89, opening contacts 90 and 91 and therefore stopping motor 6. Since the first position mark is a recorded "1" mark, the state of flip-flop circuit 98 and binary circuit 99 is unaffected.

When it is desired to move toward the second program point, playback start switch 95 is depressed, causing flip-flop circuit 92 to reset and assume the "0" state to de-energize actuating winding 89. As soon as actuating winding 89 is deenergized, direct current motor 6 begins to rotate in the counterclockwise direction, moving movable member 10 and read-write head 9 toward the respective locations B and B'. As soon as read-write head 9 reaches position B', a series of positive pulses will appear on conductor 50. These positive pulses pass through OR circuit 93 and cause flip-flop 92 to assume the set state, again energizing actuating winding 89 and terminating operation of the motor. Also, the positive pulses on conductor 50 cause flip-flop circuit 98 to assume the "1" state, which in turn causes binary circuit 99 to change to the "1" state. When binary circuit 99 assumes the "1" state, actuating winding 82 is deenergized, and therefore movable contacts 83 and 84 assume a position which conditions the motor 6 to next rotate in the clockwise direction.

When it is desired to cause movable member 10 to move toward the third program point, playback start switch 95 is again depressed. When this switch is depressed, movable contacts 97 close and the positive output potential from flip-flop circuit 98 is applied to one-shot multivibrator circuit 77, causing the indexing mechanism to move read-write head 9 to the adjacent track 14. Depressing the playback start switch also opens movable contacts 94, deenergizing actuating winding 89, and therefore motor 6 is energized and rotates in a clockwise direction. Depressing playback start switch 95 also closes contacts 96, resetting flip-flop circuits 98 and 92, which accordingly assume the "0" state. As soon as read-write head 9 reaches the position C', a series of pulses are applied on either line 50 or 51, depending upon the type of mark recorded, causing flip-flop circuit 92 to assume the "1" state, terminating the motor operation. Flip-flop circuit 98 and binary circuit 99 cause indexing and change of motor direction if a "0" magnetic mark appears.

This program for automatically positioning movable member 10 can be repeated in this manner as many times as is desired. In an actual installation, the playback start switch 95 can be part of an auxiliary control device which controls some auxiliary operation when the movable member 10 is at a particular position. As soon as the auxiliary operation is completed, the playback start switch 95 would automatically be depressed, causing the movable member 10 to move toward the next program point. Thus, the program is completed by depressing start switch 95 the appropriate number of times corresponding to the number of program points. At the completion of the program, movable transducer 9 can be returned to the initial position by a suitable circuit (not shown). For example, index motor 28 can be of the type which can be run continuously in the reverse direction so that, when energized in this manner, the index motor will cause the movable transducer to move toward support block 16 (FIG. 2) until actuation of limit switch 32 automatically disconnects the index motor.

Figure 5:
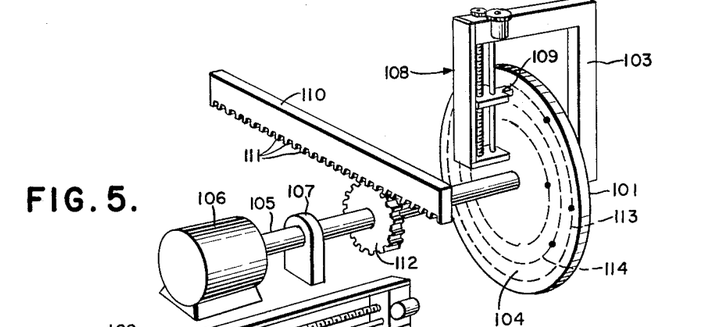
FIGS. 5–8 are perspective diagrammatic views of apparatus in accordance with additional embodiments of the invention.

Apparatus in accordance with a second embodiment of the invention is illustrated in FIG. 5, this embodiment differing from that illustrated in FIG. 1 in that the disc rotates relative to a stationary read-write head instead of having the read-write head rotate relative to a stationary disc.

A shaft 105 of direct current motor 106 is suitably journaled in a bearing housing 107. The free end of shaft 105 is rigidly attached to a disc 101, preferably of aluminum or other nonmagnetic material. A surface 104 of the disc is coated with a suitable magnetizable material such as iron oxide. A pinion gear 112, preferably of the split gear anti-backlash type, is securely affixed to shaft 105 at a point between housing 107 and disc 101. An elongated bar member 110 is fashioned in the form of a rack having teeth 111 adapted to mesh with the teeth of a pinion gear 112 thus forming a rack and pinion arrangement for positioning movable member 110 in accordance with the angular position of shaft 105. The apparatus in FIG. 5 thus far described is essentially the same as that previously described in FIG. 1, except that the disc 101, instead of the indexing mechanism, is attached to the end of shaft 105.

The indexing mechanism 108 is essentially the same as that described in detail in FIG. 2, except that shaft 5 is not attached to the upper surface of support block 15. Instead, a suitable stationary supporting structure 103 is securely fastened to the lower surface (as viewed in FIG. 2) of the support block 15. Indexing mechanism 108 remains stationary, but is operable to selectively position read-write head 109 at various radial distances with respect to disc 101 corresponding to the concentric recording tracks 113 and 114.

The control apparatus for the FIG. 5 embodiment is essentially the same as that previously described in FIG. 3. Note that the relative angular movement between read-write head 109 and disc 101 is identical to corresponding movements between read-write head 9 and disc 1. Therefore, motor 106 is connected in place of motor 6, read-write head 109 is connected in place of read-write head 9, and the digital motor of the indexing mechanism 108 is connected in place of digital motor 28.

Figures 6, 7, 8:
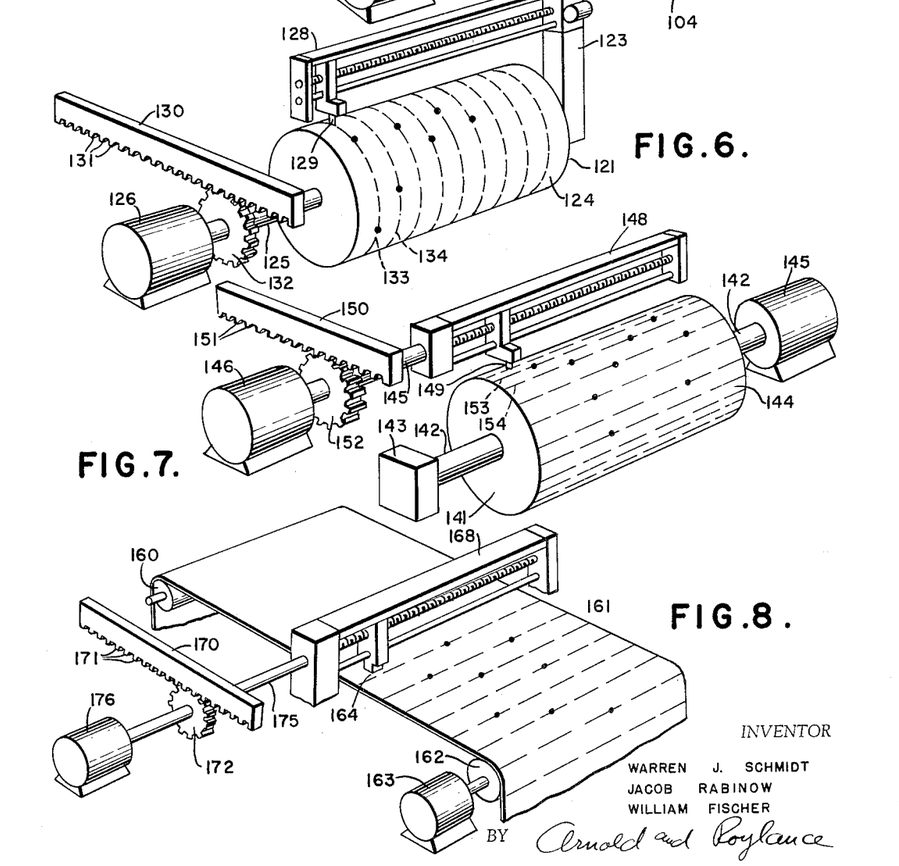

Another embodiment of the invention is illustrated in FIG. 6 where a magnetic drum is utilized in place of a disc. The position marks are recorded at angular positions on the separate tracks, the separate tracks being spaced longitudinally surrounding the drum.

The drum 121 is of a generally cylindrical configuration and is constructed of aluminum or other suitable nonmagnetic material. The cylindrical surface 124 of drum 121 is coated with a suitable magnetic material such as iron oxide. Drum 121 is mounted on the free end of shaft 125 of a direct current motor 126. A pinion gear 132, preferably of the split gear anti-backlash type, is securely fastened to shaft 125 at a position between the motor and the drum. A movable member 130 in the form of an elongated rack has teeth 131 along the lower surface (as viewed) in a position to mesh with the gear teeth of pinion gear 132. Thus, as shaft 125 rotates, the rack and pinion arrangement moves movable member 130 longitudinally and simultaneously rotates drum 121 to various corresponding angular positions.

A read-write head 129 is selectively positioned longitudinally with respect to the surface of drum 121 by an indexing mechanism 128. The indexing mechanism is essentially the same as that previously described in FIG. 2 with a stationary support member 123 securely fastened to the lower surface of support block 15 (as viewed in FIG. 2). Accordingly, the indexing mechanism 128 is stationary and is operative to position the read-write head 129 corresponding to the various longitudinally space tracks 133, 134, etc. The spacing between adjacent tracks is such that there is no appreciable cross talk between the adjacent tracks, i.e., so the magnetic marks recorded on one track will not interfere with magnetic marks on the adjacent track. The pitch of the threaded shaft 19 (FIG. 2) and the diameter of gears 20 and 29 is such that one complete revolution of motor 28 moves the read-write head a distance corresponding to the longitudinal distance between adjacent tracks on drum 121.

The tracks 133 and 134 lie in a plane perpendicular to the longitudinal axes of the drum. As shaft 125 rotates, movable member 130 is moved along its longitudinal axis, and the circular tracks move with respect to stationary read-write head 129. Accordingly, the angular position of read-write head 129 with respect to the circular tracks is always a function of the position of the movable member 130.

The control circuits for the embodiment illustrated in FIG. 6 are essentially the same as previously described in FIG. 3. More specifically, motor 126 replaces motor 6, read-write head 129 replaces read-write head 9 and the digital motor of indexing mechanism 128 replaces digital motor 28.

Another embodiment of the invention is illustrated in FIG. 7, where a magnetic drum is utilized and the separate recording tracks are located longitudinally along the surface of the drum. The drum 141 is of a generally cylindrical configuration and is constructed of aluminum or other nonmagnetic material. The cylindrical surface 144 of the drum is coated with a magnetizable material such as iron oxide. Drum 141 is securely fastened to a shaft 142 of a digital indexing motor 145. The free end of shaft 142 is suitably journaled in a support block 143.

The spacing between the adjacent longitudinal tracks on the surface of drum 141 is such that magnetic pulses recorded on one track do not interfere with magnetic pulses recorded on adjacent tracks. Motor 145 is of a digital indexing type which causes shaft 142, and drum 141, to rotate a friction of a revolution each time the motor is actuated by an electrical pulse. The fraction of a revolution caused by actuation of motor 145 is such that an adjacent track is positioned beneath the read-write head 149 upon each separate actuation.

The positioning mechanism 148 which supports read-write head 149 is a modified version of that shown in FIG. 2. The shaft 5, indexing motor 28 and gear 20 shown in FIG. 2 are removed. The free end of threaded shaft 19 which emerges from support block 15 is extended and is shown in FIG. 7 securely fastened to shaft 145 of a direct current motor 146. Accordingly, read-write head 149 moves longitudinally between the support blocks of the mechanism 148 as shaft 145 rotates.

A pinion gear 152, preferably of the split gear anti-backlash type, is securely fastened to shaft 145 between motor 146 and positioning mechanism 148. A movable member 150 in the form of an elongated rack has teeth 151 on the lower surface (as viewed) which cooperate with the teeth of a pinion gear 152. Thus, movable member 150 is positioned by the rotary movement of shaft 145.

The control apparatus illustrated in FIG. 3 is adapted for this embodiment by connecting direct current motor 146 in place of motor 6, connecting read-write head 149 in place of read-write head 9, and by connecting digital motor 145 in place of digital motor 28. During the record mode, direct current motor 146 is manually operated, positioning movable member 150 and head 149. When the position is reached corresponding to a selected program point, read-write head 149 is actuated to record the magnetic mark on the cylindrical drum surface, the longitudinal position of this mark on a particular track being indicative of the corresponding position of movable member 150. One or more position marks are placed on the track in this manner, and then digital motor 145 is actuated to bring an adjacent track beneath read-write head 149.

In the playback mode, the movable member, the drum, and read-write head are placed in their initial positions. Direct current motor 146 then moves the movable member 150 and read-write head 149 toward the positions corresponding to the first program point, the motor being connected to stop when the program point is reached. When the last mark on a particular track is reached index motor 145 is actuated, bringing an adjacent track beneath the read-write head. In this manner, the control circuit of FIG. 3 properly controls the apparatus shown in FIG. 7.

Another embodiment of the invention is illustrated in FIG. 8 where conventional magnetic tape having a magnetizable surface is employed as a recording medium. The magnetic position marks are recorded in separate tracks running transversely across the tape. The magnetic tape 161 extends between an idler roller 160 and a driven roller 162. Where necessary, driven roller 162 can be provided with a sprocket arrangement adapted to engage a series of apertures along the longitudinal edge of tape 161 for more positive driving engagement. Driven roller 162 is mounted on the shaft of a digital motor 163. When digital motor 163 is actuated by an electrical pulse, driven roller 162 is rotated a fraction of a revolution sufficient to bring an adjacent track beneath read-write head 164. The spacing between the adjacent tracks is sufficient to prevent any appreciable cross talk.

The positioning mechanism 168 is essentially the same as that perviously described in FIG. 7. The threaded shaft of the positioning mechanism is connected to a shaft 175 of a D.C. motor 176. A movable member 170 in the form of a rack has teeth 171 which mesh with the teeth of a pinion gear 172, the pinion gear being affixed to shaft 175. Preferably, pinion gear 172 is of the split gear anti-backlash type. Thus, rotation of shaft 175 positions movable member 170 along its longitudinal axis, and positions read-write head 164 at a corresponding position between the support blocks of positioning mechanism 168.

The control circuits of FIG. 3 are operative to control the apparatus shown in FIG. 8. Direct current motor 176 replaces direct current motor 6; read-write head 164 replaces read-write head 9; and digital motor 163 replaces digital motor 28. The manner in which the apparatus shown in FIG. 8 operates in the record mode or the playback mode is essentially similar to that previously described for FIG. 7, except that the digital motor advances the tape, bringing adjacent tracks beneath the read-write head, whereas in FIG. 7 the digital motor rotates the drum to similarly bring adjacent tracks beneath the read-write head.

Figure 9:
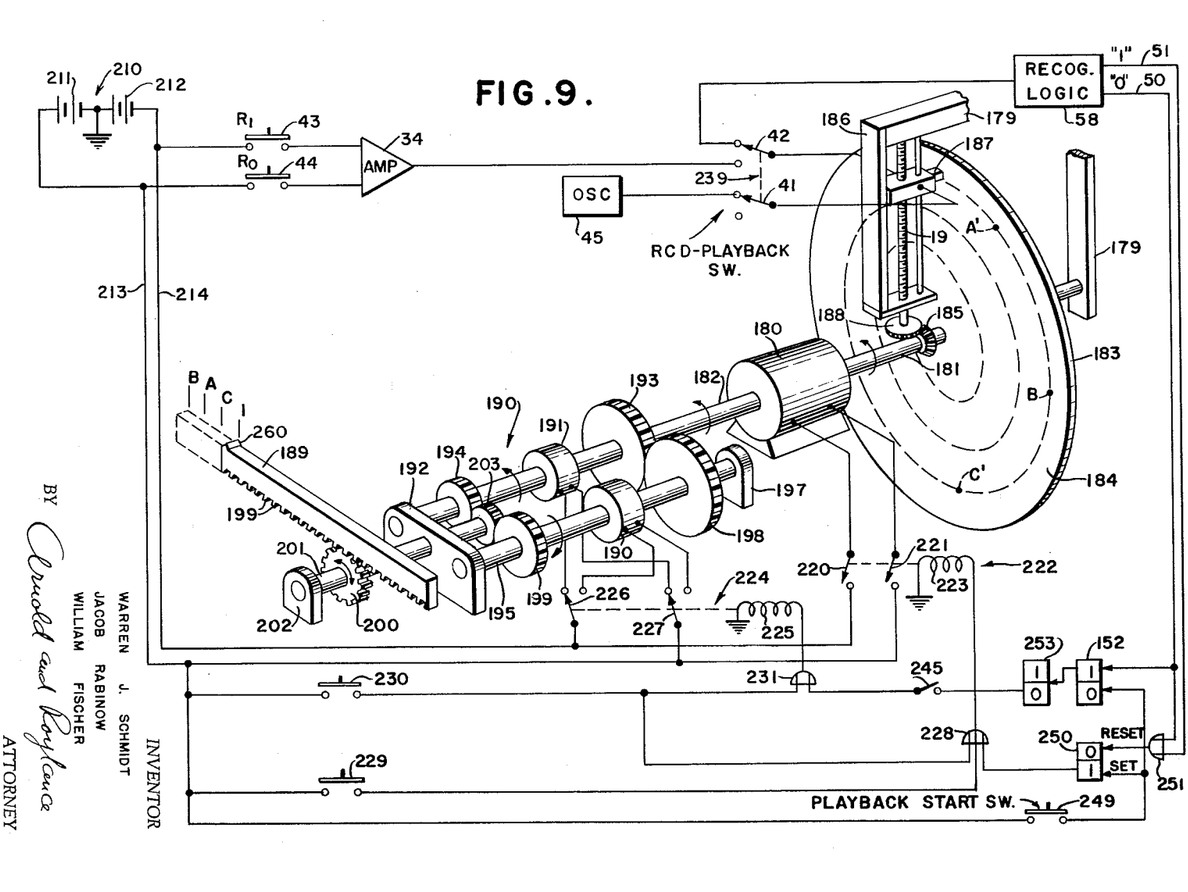
FIG. 9 is a combined perspective diagrammatic view of apparatus in accordance with still another embodiment of control and a schematic diagram of the associated electrical circuits.

Another method for arranging multipoint position data on a recording medium, in accordance with this invention, entails recording successive program points on the same track such that the distance between successive marks is proportional to the absolute distance between successive locations of the movable member. The position marks are recorded by apparatus which causes a read-write head to move in a single direction while the movable member is controlled bidirectionally. Such apparatus is illustrated in FIG. 9.

A double-ended direct current motor 180 has a shaft 181 extending from one end, and a shaft 182 extending from the other end, the shafts being arranged for simultaneous rotation by the motor. The free end of shaft 181 is journaled in a support member 179. A disc 183, preferably of aluminum or other nonmagnetic material, has one side coated with iron oxide or other magnetizable material and is securely fastened for rotation with shaft 181. A bevel gear 185 is affixed to shaft 181 between the disc 183 and motor 180. A stationary positioning mechanism 186 for positioning a read-write head 187 with respect to disc 183 is a modified version of the mechanism illustrated in detail in FIG. 2. Referring to FIG. 2, the shaft 5, digital motor 28 and gear 20 are removed, and threaded shaft 19 is lengthened to extend beyond end support block 16. A bevel gear 188 is affixed to the free end of threaded shaft 19 which extends beyond the support block. The support structure 179 is of a suitable L-shaped configuration and is attached to the lower surface of support block 15 (as viewed in FIG. 2) so as to maintain positioning mechanism 186 stationary in a position where the teeth of bevel gear 188 mesh with the teeth of bevel gear 185. Assuming the read-write head 187 is initially positioned near the periphery of the disc, rotation of shaft 181 causes disc 183 to rotate and simultaneously causes read-write head 187 to gradually move toward the center of the disc. Thus, read-write head 187 traces a spiral path on the surface of disc 183. The realtive diameters of gears 185 and 188, and the pitch of threaded shaft 19 are such that read-write head 187 will move sufficiently during one revolution of disc 183 to prevent any cross talk with adjacent portions of the track.

A movable member 189 is mechanically connected to motor 180 through a bidirectional coupling mechanism 190. This mechanism includes shaft 182 which is of the split shaft type where the two portions of the shaft are connected by an electromechanical clutch 191. The free end of shaft 182 is journaled in a support block 192. A gear 193 is secured to shaft 182 between the motor and clutch 191, and a second gear 194 is affixed to shaft 182 between the clutch and support block 192. A parallel idler shaft 195 is also of the split shaft type where the two portions of the shaft are connected by an electromechanical clutch 196, the free ends of shaft 195 being journaled respectively in support blocks 192 and 197. A gear 198 is affixed to shaft 195 at a position between clutch 196 and support block 197. The idler shaft 195 is so positioned that the teeth of gear 198 mesh with the teeth of gear 193. A second gear 199 is fixed to shaft 195 between the clutch and support block 192. Movable member 189 is in the form of an elongated rack having teeth 199 on the lower surface which mesh with teeth of a pinion gear 200. Pinion gear 200 is affixed to a shaft 201 at a position between support blocks 192 and 202 in which shaft 201 is journaled. Shaft 201 extends beyond support block 192 and has a gear 203 affixed to the free end. Shaft 201 is so positioned that gear 203 meshes with gears 194 and 199.

Each of the gear couplings should be constructed to minimize backlash. This can be accomplished, for example, by using gears of the well-known split gear anti-backlash construction.

Motor 180 is so connected that it rotates only in the counterclockwise direction. Thus, when the motor rotates, gear 193 rotates in the counterclockwise direction and gear 198 rotates in the clockwise direction. If electromechanical clutch 191 is actuated, gear 194 rotates counterclockwise and therefore gear 203 rotates clockwise, causing movable member 189 to move toward the right (as viewed). If electromechanical clutch 196 is actuated, gear 199 rotates clockwise and therefore gear 203 rotates counterclockwise, moving movable member 189 to the left (as viewed). Thus, movable member 189 can be moved in either direction, depending upon which of the clutches 191 and 196 is actuated.

Energy for the electrical circuits is provided by a power supply 210 which is shown including a battery 211 having the negative terminal connected to ground and a battery 212 having its positive terminal connected to ground. A positive supply conductor 213 is connected to the positive terminal of battery 211, and a negative supply conductor 214 is connected to the negative terminal of battery 212. Accordingly, conductors 213 and 214 provide respectively positive and negative potentials with respect to ground.

Direct current motor 180 is connected to conductors 213 and 214 via normally open relay contacts 220 and 221, respectively, of relay 222. The connections to motor 180 are such that the motor rotates in a counterclockwise direction when energized. Relay 222 also includes an actuating winding 223 which, when energized, moves the associated contacts 220 and 221 to the closed position. An electromagnetic relay 224 includes an actuating winding 225 and a pair of two-position contacts 226 and 227. When contacts 226 and 227 are in the normal position, i.e., the position when actuating winding 225 is not energized, clutch 191 is connected to conductors 213 and 214 via movable contacts 226 and 227, respectively. When actuating winding 225 is energized, movable contacts 226 and 227 move to the alternate position and connect clutch 196 to conductors 213 and 214, respectively.

One end of actuating winding 223 is connected to ground, the other end of the actuating winding being connected to the output of a three-input OR logic circuit 228. Logic circuit 228 is of the type that provides a positive output potential whenever a positive potential is supplied to any one of the input terminals. One of the input terminals of OR logic circuit 228 is connected to positive conductor 213 via normally open switch 229, and a second input of OR logic circuit 228 is connected to positive conductor 213 via normally open switch 230. One end of actuating winding 225 is connected to ground, and the other end of the actuating winding is connected to the output of two input OR logic circuit 231. Logic circuit 231 is similar to logic circuit 228 and provides a positive potential, energizing actuating winding 228 whenever a positive potential is supplied to either of the input terminals. One of these input terminals is connected to positive conductor 213 via normally open switch 230.

Switches 229 and 230 are used during the record operation to manually control motor 180 and clutches 191 and 196. When switch 229 is closed, a positive potential is provided, energizing actuating winding 223, thus closing contacts 220 and 221 and energizing motor 180. When motor 180 is energized, it rotates disc 183 in a counterclockwise direction and causes read-write head 187 to gradually move toward the center of the disc. Since relay 224 is not energized when switch 229 is closed, clutch 191 is in the actuated state and therefore movable member 189 moves toward the right. If switch 230 is closed instead of switch 229, a positive potential is supplied, energizing actuating windings 225 and 223 via their respective OR logic circuits. Energization of actuating winding 225 actuates clutch 196 and energization of actuating winding 223 closes contacts 220 and 221, energizing motor 180. This energization of motor 180 causes disc 183 to rotate in the same counterclockwise direction, causes head 187 to move toward the center of the disc, and causes movable member 189 to move toward the left. It should be noted, therefore, that closing either switch 229 or 230 causes the same motion of read-write head 187 and disc 183, whereas closing switch 229 causes movable member 189 to move toward the right, and closing of switch 230 causes movable member 189 to move toward the left.

Read-write head 187 is essentially the same as read-write head 9, previously described in FIG. 4. The circuits connected to the read-write head are the same as in FIG. 4, and therefore like reference numerals are employed. Switch 43 is connected to negative supply conductor 214 and therefore causes a magnetic "1" to be recorded on disc 183 when closed. Switch 44 is connected to positive supply conductor 213 and therefore causes a magnetic "0" mark to be recorded on disc 183 when closed. Switches 41 and 42 are ganged, forming record-playback switch 239. When the movable contacts of this switch are in the lower position (as viewed), the record circuits are connected to the read-write head. When the movable contacts of switch 239 are in their upper position as shown, the playback circuits consisting of oscillator 45 and recognition logic circuit 58 are connected to the read-write head. If a recorded "0" mark is detected, a series of positive pulses appear on line 50 and if a recorded "1" mark is detected, a series of positive pulses appear on conductor 51.

When operating in the playback mode, direct current motor 180 is energized in response to closing of a playback start switch 249, and remains energized until a magnetic mark is detected by read-write head 187. This control function is accomplished by means of flip-flop multivibrator circuit 250. The set input of circuit 250 is connected to positive conductor 213 via normally open switch 249. When switch 249 is closed, a positive potential is applied on the set input and circuit 250 assumes the "1" state. Conductors 50 and 51 from recognition logic circuit 58 are connected to the reset input of circuit 250 through an OR logic circuit 251. When a positive potential is applied on either input of OR logic circuit 251, a positive potential is applied on the reset input of circuit 250, causing the flip-flop circuit to assume the "0" state. A positive potential for energizing actuating winding 223 is provided via three-input OR logic circuit 228 when flip-flop circuit 250 is in the "1" state.

During the playback operation, the directional coupling apparatus 190 is operated to change direction of movable member 189 subsequent to detection of a "0" magnetic mark. The circuits for accomplishing this control function include a flip-flop multivibrator circuit 252, essentially the same as previously described circuit 250, and a binary multivibrator circuit 253. The binary multivibrator circuit has two stable states, for convenience referred to as the "0" state and the "1" state. Whenever a positive pulse is applied to the symmetrical input of the binary circuit, the circuit changes state. A positive energizing potential is applied to actuating winding 225 via OR logic circuit 231 and switch 245 when the binary multivibrator circuit 253 is in the "0" state. The symmetrical input of the binary circuit is connected to the output from flip-flop circuit 252. The reset input of flip-flop circuit 252 is connected to positive conductor 213 via normally open switch 249, and the set input is connected to conductor 50.

When switch 249 is closed, flip-flop circuit 252 is reset to the "0" state. Thereafter, if the magnetic mark detected by read-write head 187 is a "0" mark, a series of positive pulses are supplied to the set input of flip-flop circuit 252 via conductor 50. The flip-flop circuit responds to the first of these positive pulses and assumes the "0" state, providing a positive pulse to the symmetrical input of binary circuit 253, causing the binary circuit to change state. In this manner, clutches 191 and 196 are actuated alternately, i.e., the alternate clutch is actuated in response to a detected "0" mark.

To illustrate the operation of the apparatus shown in FIG. 9, it is assumed desirable to record a program for causing the movable member to move from an initial position I, as indicated by pointer 260 at the end of movable member 189, to the left to a position A, then further to the left to a position B, and then to the right to a position C.

First, record-playback switch 239 is moved to the lower position and switch 245 is placed in the open position. Movable member 189 is placed in the initial position, and read-write head 187 is placed in the outermost position with respect to disc 183. Switch 230 is then closed and maintained in the closed position until movable member 189 moves sufficiently toward the left to reach the first location A. This movement also causes read-write head 187 to move along the spiral track to a corresponding position A'. Since the next program point, corresponding to location B, is reached by travelling the same direction from point A as is required to reach point A from the initial position I, switch 43 is closed, causing a magnetic "1" mark to be recorded at position A' on disc 183. Switch 230 is then again actuated, causing movable member 189 to move further to the left and is maintained in the closed position until the movable member reaches location B. During the same time, read-write head 187 has moved along the spiral track to a corresponding position B'. Since a change of direction is required to reach the next successive program point C, switch 44 is closed, causing a magnetic "0" mark to be recorded at position B' on disc 183. Next, switch 229 is closed, causing movable member 189 to move toward the right, and causing read-write head 187 to continue moving along the spiral track in the same direction. Switch 229 is maintained in the closed position until movable member 189 reaches location C, at which time read-write head 187 reaches the corresponding position C'. Either switch 43 or 44 is then closed to record the appropriate type of mark indicating which direction is required to reach the next successive program point.

In recording program points, it is important that movable member 189 be moved directly to the proper location. If, for example, in attempting to reach location A the operator overshoots the location, it is not possible to correct this error by changing the direction of bidirectional coupler 190 to return the movable member to the proper location since movable transducer 187 would continue to move in the same direction and hence the position mark would be recorded at an improper location on memory disc 184. The overshoot error, however, can be corrected by leaving the bidirectional coupler 190 coupled in the same direction and by then manually returning the movable member to the proper location since this would reverse the direction of both the movable member and the movable transducer.

For playback operation, the movable member 189, disc 183 and read-write head 187 are first all placed in the same initial position as at the beginning of the record operation. Flip-flop circuits 250 and 252, and binary circuit 253 are all placed in the "0" state (by means of conventional circuits, not shown). The movable contacts of record-playback switch 239 are moved to the upper position, as shown, connecting oscillator 45 and recognition logic circuit 58 to read-write head 187 and switch 245 is closed. Next, the playback start switch 249 is closed, which places flip-flop circuit 250 in the "1" state, thereby energizing actuating winding 223, to in turn energize motor 180. Since binary circuit 253 is initially in the "0" state, actuating winding 225 is energized and clutch 196 is actuated. When motor 180 is energized under these circumstances, the movable member 189 will move toward the left and toward the first program point at location A. This rotation of motor 180 causes read-write head 187 to move along the spiral track toward the recorded program point A'. When read-write head 187 reaches the location A', the magnetic "1" mark recorded there causes a series of positive pulses to be provided on conductor 51, causing circuit 250 to assume the "0" state. Accordingly, relay 222 is deenergized and motor 180 is disconnected.

When it is desired to have the movable member 189 moved toward the second program point, switch 249 is again closed, causing binary circuit 250 to assume the "1" state, to thereby again energize motor 180 to move the movable member toward the left, and toward location B. When read-write head 187 reaches the corresponding location B', the "0" magnetic mark recorded there is detected and causes a series of positive pulses to be supplied on conductor 50. These positive pulses cause flip-flop circuit 250 to assume the "0" state, again disconnecting motor 180. The positive pulses on conductor 50 are also applied to the flip-flop circuit 252, causing this circuit to assume the "1" state, which in turn causes binary circuit 253 to change state. Actuating winding 225 is therefore deenergized and clutch 191 is actuated instead of clutch 196.

When it is desired to have the movable member move toward the third program point, switch 249 is again closed, causing flip-flop circuit 250 to assume the "1" state, thereby energizing direct current motor 180. Since clutch 191 is now actuated, movable member 189 moves toward the right, while read-write head 187 continues in the same direction along the spiral track on disc 183. When read-write head 187 reaches the location C' on disc 183, positive pulses are supplied via either conductor 50 or 51 causing flip-flop circuit 250 to again assume the "0" state, thus deenergizing motor 180. This completes the playback of the three-point program.

While several illustrative embodiments have been illustrated in detail, they are by no means exhaustive. For example, recording media other than magnetic recording media can be used along with appropriate read-write transducers. When a magnetic medium is used, the read-write head can be of any convenient flux responsive type, i.e., of any type which does not depend upon relative motion between the head and the recording medium. Furthermore, the movable member need not be restricted to a single degree of movement so long as the transducer position is always a function of the movable member position.

The invention is more specifically defined in the appended claims.

What is claimed is:
1. In automatic position recording apparatus, the combination of
  a movable member capable of assuming a plurality of different positions;
  a magnetic recording medium having a plurality of separate recording tracks thereon;
  a magnetic recording transducer
    having a position with respect to said recording medium such that the transducer position is always a function of the movable member position, and
    being operable to record at least one position mark along said first track at a position thereon indicative of a corresponding selected position of said movable member; and
  indexing means operative in response to a change in direction of said movable member for moving said magnetic recording transducer into a cooperative relationship with others of said tracks such that said transducer can similarly record at least one position mark indicative of other selected positions of said movable member on each of said other tracks.

2. Apparatus in accordance with claim 1 wherein said apparatus is adapted to record marks successively and said transducer is capable of recording two distinct types of position marks
  such that the type of mark recorded indicates the direction in which said transducer travels in reaching the next successive position mark.

3. In automatic positioning apparatus, the combination of
  a member movable in either direction along a single axis;
  bidirectional driving means for causing motion of said member;
  a record medium having thereon a plurality of position marks indicative of successive desired positions for said member;
  responsive means having a position with respect to said record medium in accordance with the position of said movable member for providing an electrical output indication whenever in a position corresponding to one of said position marks;
  circuit means connected to control said bidirectional driving means and responsive to said electrical output indications such that said movable member is driven to successive positions corresponding to successive desired positions indicated by said position marks, said position marks being of two different types such that the type of mark indicates the direction of travel required to reach the next succeeding position mark, and said circuit means being operative in response to said different position marks as detected by said responsive means to selectively energize said driving means and cause said movable member to move in a direction towards the next successive selected position.

4. Apparatus in accordance with claim 3 wherein a position mark of one type indicates that the next succeeding desired position is reached by travelling in the same direction and a position mark of the other type indicates that the next succeeding desired position is reached by reversing the direction of travel, and
  wherein said circuit means is responsive to position marks of said other type to change the energization of said bidirectional driving means such that the direction of travel is reversed.

5. Apparatus in accordance with claim 4 wherein said position marks are recorded on a plurality of different recording tracks on said medium, where successive position marks which are reached by travelling in the same direction are recorded in the same track, and where position marks which are reached by reversing the direction of travel are recorded in a different track from that in which the previous position mark is recorded; and means for indexing said responsive means to a different track when the last successive position mark in a track is detected by said responsive means.

6. In automatic positioning apparatus, the combination of a member movable in either direction;

bidirectional driving means for causing movement of said member;

a record medium having a plurality of record tracks, each of said tracks having at least one position mark thereon,
said position marks being successive and at locations indicative of successive desired positions for said movable member;

transducer means responsive to said marks and having a position with respect to said medium which is a function of the movable member position;

indexing means for selectively positioning said responsive means in operative relationship with different ones of said tracks; and circuit means connected to said responsive means for controlling said bidirectional driving means and said indexing means such that said movable member reaches said desired positions successively.

7. Apparatus in accordance with claim 6 wherein at least one of said tracks has a plurality of successive position marks thereon indicative of successive desired positions which are reached by moving said member in the same direction and wherein said circuit means is operative to cause said movable member to move in a single direction, thus reaching said desired positions in accordance with the position indications provided by said plurality of successive position marks, and being further operative to actuate said indexing means when the last of said plurality of successive position marks is detected.

8. In automatic positioning apparatus, the combination of a magnetic recording disc;

a magnetic read-write head for recording position marks on said disc and for detecting previously recorded position marks;

a movable member;

driving means for moving said head along a circular track with respect to said magnetic disc and for simultaneously moving said movable member such that the angular position of said head with respect to said disc is always a function of the movable member position;

recording circuit means for selectively energizing said head to record position marks on said circular track at positions indicative of corresponding selected positions of said movable member to form a recorded program; and playback circuit means for controlling said driving means in accordance with a previously recorded program by causing motion of said movable member and said head until said head reaches a position corresponding to a previously recorded position mark.

9. Apparatus in accordance with claim 8 wherein said magnetic disc is stationary and said head moves in a circular path with respect to said stationary disc.

10. Apparatus in accordance with claim 8 wherein said magnetic disc is provided with a plurality of concentric annular tracks, and said apparatus further comprises indexing means for selectively positioning said head in an operative relationship with different ones of said concentric circular tracks.

11. Apparatus in accordance with claim 10 wherein said magnetic disc is stationary;

said driving means is operable to move said read-write head to various angular positions with respect to said disc; and said indexing means is operable to move said head to position along selected radii of said disc.

References Cited by the Examiner

UNITED STATES PATENTS

| 2,484,049 | 10/1949 | Putt _______________ 318—162 |
| 2,590,091 | 3/1952 | Devol ____________ 318—162 X |
| 2,618,770 | 11/1952 | Schwartz __________ 318—467 |
| 3,012,453 | 12/1961 | Mottu et al. _______ 318—162 X |
| 3,028,579 | 4/1962 | McCarter et al. ____ 318—162 X |
| 3,072,834 | 1/1963 | Mottu ______________ 318—162 |

FOREIGN PATENTS 804,191  11/1958  Great Britain.

JOHN F. COUCH, *Primary Examiner.*